3,003,309
SINGLE LEVER CONTROL APPARATUS FOR ENGINE AND HYDRAULIC TRANSMISSION
Eric H. Bowers, Cheltenham, England, and Oswald Thoma, Grunwald, near Munich, Germany, assignors to Dowty Hydraulic Units Limited, Ashchurch, Tewkesbury, England, a company of Great Britain
Filed Jan. 29, 1960, Ser. No. 5,493
Claims priority, application Great Britain Jan. 30, 1959
6 Claims. (Cl. 60—19)

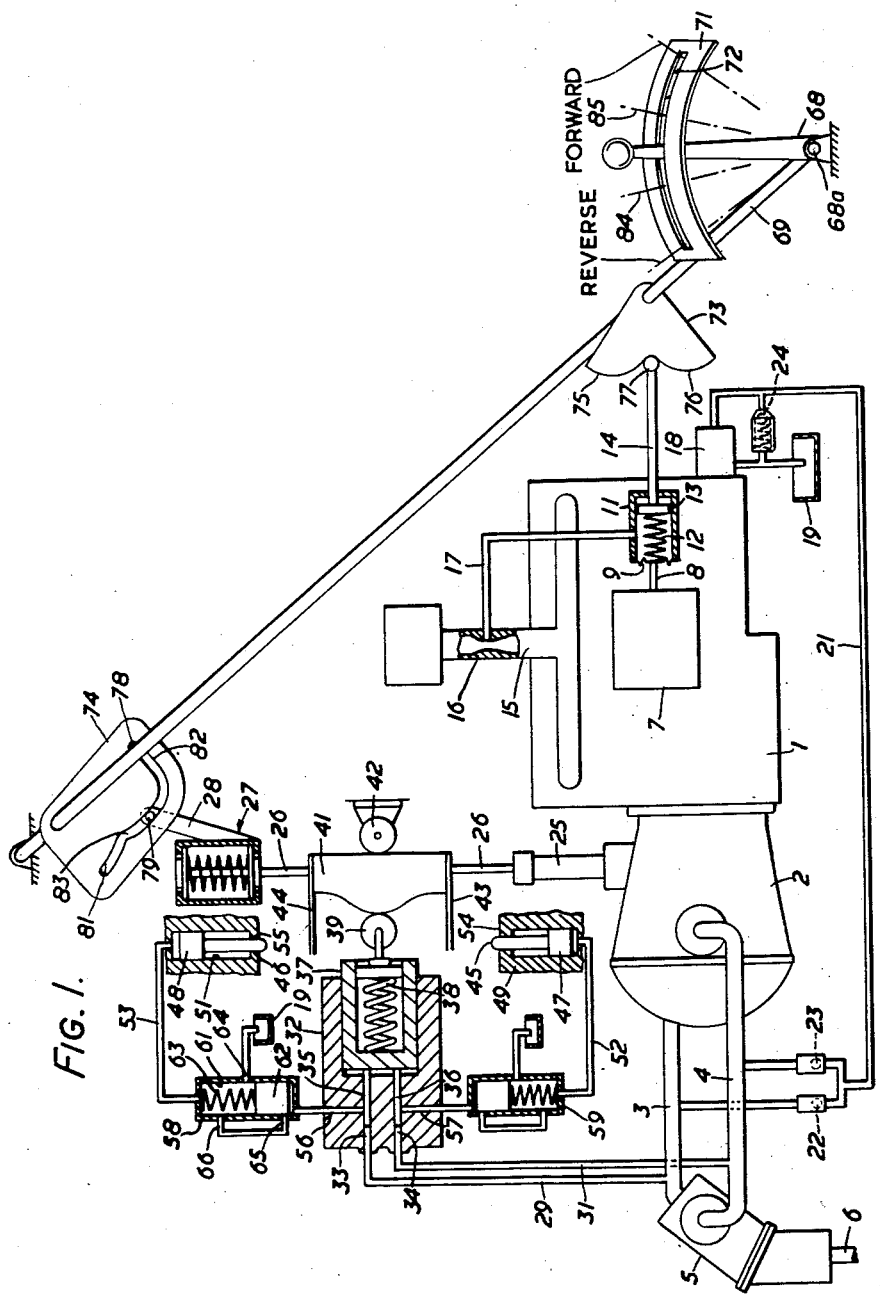

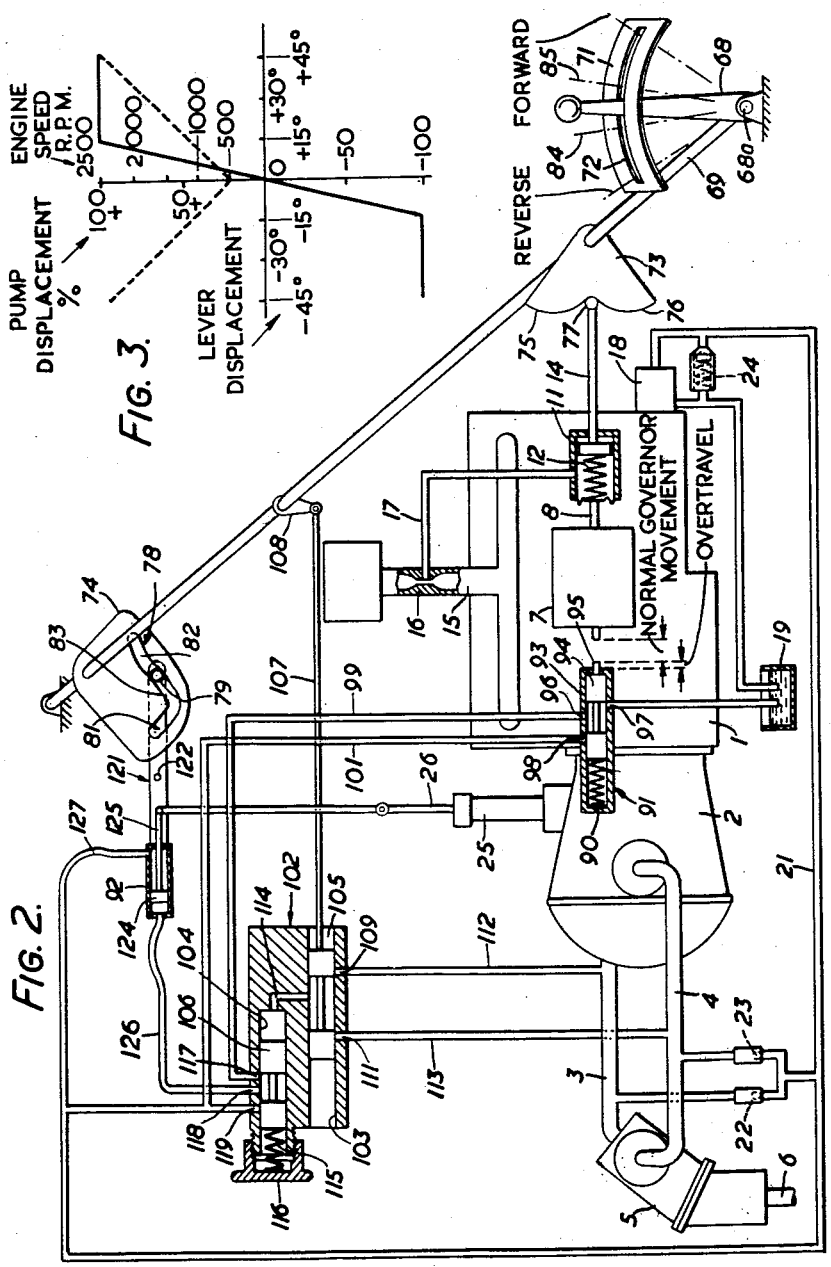

This invention relates to control apparatus for infinitely variable speed power transmission used for the transmission of power from a variable speed prime mover to a load. The main object of the present invention is to provide a single control member operable both on the speed ratio of the transmission and on the speed of the prime mover whereby to enable the prime mover to operate at or near maximum efficiency where substantial power is delivered by the prime mover, and also to facilitate slow speed low power movement of the load. Where the invention is applied to the engine and transmission forming the drive for the ground engaging wheels of a vehicle such as a tractor it will be possible by operation of the single control member to drive the vehicle so that the gear ratio is always appropriate at substantial power outputs having regard to the speed of the engine whereby to make efficient use of engine power, and also to facilitate slow speed low power movement of the vehicle for manoeuvring purposes. The invention is not confined to transmissions for vehicles and there are many other uses in which it may be put, for example in the control of the winding mechanism of a crane or other load moving appliance.

In accordance with the present invention a control apparatus for a power transmission having an infinitely variable speed ratio and arranged to transmit power from a variable speed prime mover such as an internal combustion engine to a load, comprises a single manual control movable from a neutral to a maximum position, arranged in the first part of its movement from the neutral position simultaneously to raise the prime mover speed from low to a minimum power delivering speed and to increase the speed ratio of the transmission from zero to a maximum, the remaining part of its movement to the maximum increasing prime mover speed to the maximum, together with automatic means to reduce the selected speed ratio to the extent to prevent overloading or excessive power output demand from the prime mover. The automatic means may be operable in both directions of output rotation if the pump is of reversible displacement and whether the pump is of reversible displacement or not should be operable only in the sense to reduce the selected speed ratio of the transmission during overloading when power is being transferred from the prime mover to the load so that where it is desired to reduce the speed of the load driven by the transmission then reduction of the position of the manual control towards the neutral position will give manual control of transference of the momentum of the load for dissipation in the prime mover, without the automatic means acting on pump displacement. The manual control may comprise a lever connected to move a pair of cams which are connected individually to control speed of the prime mover and speed ratio of the transmission. The transmission may be of the kind comprising a variable positive displacement pump hydraulically interconected with a positive displacement hydraulic motor, the speed ratio being controlled by varying pump displacement. This kind of transmission may then include means as proposed in either of prior patent applications No. 704,217, filed December 19, 1957, now Patent No. 2,896,411, and No. 856,037, filed November 30, 1959, now Patent No. 2,976,685, which act to cause overriding reduction of selected pump displacement either on development of an excessively high hydraulic pressure in the transmission or on overloading of the engine when supplying power to the transmission.

Two examples of the invention for use in the transmission of power from a diesel engine through an infinitely variable hydrostatic transmission to the ground engaging wheels of a tractor vehicle will now be described with reference to the accompanying drawings in which:

FIGURE 1 is a diagrammatic illustration of the first example,
FIGURE 2 is a diagrammatic illustration of the second example, and
FIGURE 3 is a graph applicable to either example showing the relation between selected engine speed and selected pump displacement of the hydrostatic transmission.

Reference is made initially to the example disclosed in FIGURE 1.

In this example the diesel engine 1 is directly connected to a variable positive displacement hydraulic pump 2 from which a pair of hydraulic pipes 3 and 4 extend to a fixed displacement hydraulic motor 5 having an output shaft 6 connected to drive the ground engaging wheels of the tractor. The diesel engine includes the variable fuel injection pump 7 driven by the engine whose fuel output is controlled by a fuel bar 8 movable by a diaphragm 9 carried by a closed capsule 11. Within the capsule a compression spring 12 is located whose compression against the diaphragm 9 is adjustable by means of a pressure pad 13 carried by a rod 14 extending from the capsule in an airtight manner. The air induction pipe 15 of the diesel engine includes a venturi throat 16 from which a pipe 17 is connected to the capsule 11. The pressure drop below atmospheric at the throat of the venturi 16 forms a signal of engine speed and a force in accordance with speed is thus developed on the diaphragm 9. Movement of the diaphragm 9 to adjust the fuel bar 8 will take place when the engine is running at a speed such that the air pressure force on the diaphragm is not neutralised by the compression load in the spring 12. When the speed has altered to the extent that the air pressure force neutralises the spring load the engine will be running at a speed determined by the compression applied to the spring 12.

The engine also drives an auxiliary pump 18, for example a gear pump, which draws hydraulic liquid from a reservoir 19 and forces it through pipe 21 to a pair of non return valves 22 and 23 through which the liquid may pass either to the pipe 3 or the pipe 4 whichever is at the lower pressure. The pressure in pipe 21 is determined by a relief valve 24 connected from pipe 21 back to reservoir 19. For the purpose of controlling the displacement of the pump 2 a servo piston and cylinder unit 25 is provided which may derive its power either from the pressure delivered from pump 18 or from the pressure delivered by the pump 2. The construction of this servo motor 25 is quite conventional and is of no interest with regard to the present invention except that the displacement of the pump 2 follows under servo power the movements of a control rod 26 which extends from the servo motor 25. Movement for selecting pump displacement is given to the rod 26 through the medium of a caged spring unit 27 from an operating arm 28. The caged spring unit 27 is so arranged that it will normally transmit controlling force from the arm 28 to the rod 26 but under circumstances to be described further in this specification it will allow relative movement between rod 26 and arm 28 during overriding of the selected pump displacement. In this example overriding of selected pump displacement is obtained in accordance with the invention disclosed in our Patent No. 2,896,411. In order to detect the pressures developed in the transmission pipes 3 and 4 a pair of pipes 29 and 31 extend respectively from pipes 3 and 4 to a pressure sensing unit 32. Within this unit a pair of small diameter cylinders 33 and 34 are respectively connected to the pipes 29 and 31 and the pressures in these pipes act on plungers 35 and 36 within these cylinders. The plungers extend from the cylinders to engage a slide member 37 which is loaded by a compression spring 38 against the plungers 35 and 36. The loading given to the spring 38 is controlled by the engagement of a roller 39 carried by the spring 38 with a cam 41 carried by the control rod 26. It will be noted that at zero displacement the compression of spring 38 is at a maximum. As shown in the drawing the control rod is in the position representing zero displacement and is capable of movement in one direction or the other from this position to select either forward or reverse displacement of the pump 2. To resist the side load applied by spring 38 to the cam 41, a compensating roller 42 reacting from the pressure sensing unit 32 is provided. At either end of the cam 41 a pair of abutment members 43 and 44 are provided which are intended for co-operation respectively with the piston rods 45 and 46 of ram pistons 47 and 48. These pistons are mounted within cylinders 49 and 51 which may be fed with hydraulic pressure liquid through pipes 52 or 53 respectively. Each of the cylinders 49 and 51 is provided with an outstop respectively 54 and 55 which engages the pistons 47 or 48 to prevent movement beyond an outermost position which corresponds to the position where the appropriate piston rod 45 or 46 has engaged its abutment member and returned the rod 26 and cam 41 to the zero displacement position of pump 2 as shown in the drawing.

Hydraulic pressure for actuating the ram pistons 47 or 48 is obtained respectively from the pipe lines 31 or 29 when the pressure in either of these pipe lines rises to such a level that it is enabled to depress the appropriate plunger 36 or 35 against the loading of spring 38, pressure liquid then obtaining access to either of the ports 56 or 57 which open respectively into the cylinders 33 and 34. The ports 56 and 57 are respectively connected to the pipes 53 and 52 through the medium of valve units 58 and 59. These valve units are similar and a description of one unit is sufficient to explain the operation of both. Within each valve 58 or 59 a cylinder 61 is provided within which a piston 62 is slidable against the load of a light spring 63. The port 56 or 57 opens into one end of the cylinder 61 and the pressure in this port will urge the piston 62 against the loading of spring 63. When there is no pressure in the port 56 or 57 the piston moves under spring force to open a port 64 in cylinder 61 which connects the interior of the cylinder to reservoir 19. In this position the piston 62 closes a port 65 which is connected exteriorly of the cylinder to a further port 66 at the opposite end of the cylinder. When the liquid pressure appears at port 56 or 57 the piston 62 will be depressed against the loading of spring 63 to open port 65 and feed the liquid pressure to port 66 and thus to the pipe 52 or 53 thus to cause movement of the ram piston 47 or 48. When pressure is removed from the port 56 or 57 piston 62 will return to close port 65 and open port 64 thereby connecting the pipe 52 or 53 to drain and preventing the respective ram piston 47 or 48 from exerting any force on the abutment members 43 or 44.

In accordance with the present invention for controlling the displacement of pump 2 and the speed of the engine 1 a single control lever 68 pivoted at 68a is provided for movement by the driver of the vehicle. This lever 68 is connected to rotate the shaft 69 and is limited in its movement by a gate 71 having a slot 72 within which the end of lever 68 is located. The shaft 69 has a pair of cams 73 and 74 fixedly secured thereto for co-operation respectively with the rod 14 of the engine speed control and the arm 28 of the pump displacement control. The lever 68 is movable within gate 71 equally on either side of a central neutral position which represents minimum engine speed and zero pump displacement. Movement of the lever 68 in either direction from this central position will cause movement of the speed control rod 14 to cause gradual speed increase of the engine, a full displacement of the lever to either end of the slot 72 representing maximum engine speed. This is obtained by providing the cam 73 with a pair of curved surfaces 75 and 76 which engage a follower 77 carried by the rod 14. The two curved surfaces 75 and 76 are of constantly increasing radius with displacement from the central position. Thus movement of lever 68 in either direction from the neutral position will cause movement of the rod 14 to the left to progressively increase compression of spring 12 and thus increase the speed of the engine 1. The cam 74 includes a cam slot 78 which is engaged by a pin 79 carried by arm 28. The slot 78 is formed in three portions comprising two outer portions 81 and 82 and an inner portion 83. The inner portion 83 extends on either side of the neutral position for a small amount corresponding to the two angular positions indicated by dotted lines 84 and 85 adjacent to the lever 68. Within this angular range the slot 83 increases from the minimum radius at one end to a maximum radius at the other end. When the lever 68 is moved to the right to obtain forward movement of the vehicle this will cause clockwise movement of the shaft 69 and of the cam 74 which in turn will cause the pin 79 to move along the cam groove 78 to the position of maximum radius thus causing movement of the control rod 26 of servo motor 25 to increase pump displacement whereby hydraulic liquid supplied to motor 5 will cause forward movement. Alternatively movement of the lever 68 to the left to obtain reverse movement will cause the pin 79 to move along the groove 78 to the position of minimum radius thereby moving the control rod 26 to give reverse displacement of the pump 2. The grooves 81 and 82 which extend from either end of the groove's inner portion 83 extend at a constant radius about the axis of shaft 69 from the two ends of the inner portion 83 whereby when the control lever 68 has moved beyond the angular positions 84 or 85 the pin 79 will be in one or the other of the constant radius portions 81 or 82 of the groove and the pump displacement will be at a maximum in the forward or reverse direction.

In normal operation of a vehicle having the engine transmission and control apparatus as described in FIGURE 1 the vehicle driver apart from the normal steering arrangement needs only to employ the control lever 68. To select forward movement the lever is moved in the forward direction from the neutral position. The first part of the movement before reaching the angular position 85 causes the rod 26 to be moved downwardly by engagement of the pin 79 in cam slot 83 to increase displacement of pump 2 and also rod 14 will be moved by cam 73 to cause the engine speed to be increased towards the minimum speed at which substantial power may be obtained. The pump 2 having been given forward displacement will pump hydraulic liquid through pipe 4 to motor 5 to cause rotation of the ground engaging wheels at a slow speed. At the angular position 85 of lever 68 the pump displacement will have reached the maximum in forward direction and the engine speed will be at minimum power delivery speed. Further movement of the lever 68 beyond angular position 85 will increase the engine speed by moving the control rod 14 further to the left thus increasing the speed of the vehicle. If the control lever 68 is moved too quickly or alternatively if while the vehicle is moving it meets an upward incline a pressure will be developed in pipe 4 of the transmission which is capable of acting through pipe 31 against piston 36 to depress it against the loading of spring 38 thus to allow liquid to pass from port 57 to the ram piston 47 to urge this latter upwardly to engage abutment member 43 of cam 41 thus to urge this latter cam 41 and control member 26 upward. This will cause compression of the caged spring unit 27 to allow a reduction of selected pump displacement and an increase in loading of springs 38 by virtue of the fact that the cam 41 is moving towards the neutral position. As loading of spring 38 increase it will reach a stage where it moves plunger 36 against the pressure from pipe 31 almost to close port 57 thus preventing further reduction of pump displacement. A state of balance is obtained where a limited flow of liquid passes from pipe 31 through port 57 and moves the piston 62 to the extent that port 64 is partially closed thereby to allow this flow of liquid to escape in a restricted manner to reservoir 19. A small pressure is then retained within the cylinder 61 which is communicated to pipe 52 and acts to hold the cam 41 against the loading of the caged spring unit 27 in the reduced displacement position until the conditions of operation alter, such for example as gaining of speed by the vehicle, alterations of the position of control handle by the driver, or alteration of the inclination of the road along which the vehicle is travelling. However under any circumstances of operation the pump displacement will not increase beyond the value selected by engagement of the pin 79 in the cam groove 83. The cam 41 is so shaped that when pressure in one of the pipe lines 3 or 4 is sufficiently great to cause displacement reducing movement by virtue of the ram piston 47 or 48 the reduction maintains the torque demanded by the pump 2 from the engine 1 to a constant maximum value irrespective of engine speed. The torque however exerted by hydraulic motor 5 will depend on the speed ratio of the transmission as determined by the displacement in pump 2 and where there is considerable resistance to motion the speed ratio will be reduced to enable the motor to generate the required torque to cause movement of the vehicle while the torque required by the pump 2 from the engine 1 will remain at the constant value. For the purposes of manoeuvering the vehicle the driver apart from steering will merely adjust the lever 68 within the limits of the two angular positions 84 and 85, under these conditions slow speed movement of the ground engaging wheels may be obtained although of course not necessarily with high efficiency. This however is not of great importance since manoeuvring only takes place occasionally for short periods. When the vehicle is travelling at speeds it will be seen that the speed ratio as determined by the displacement of the pump 2 will continuously adjust itself to retain a constant torque on the engine which is designed to be the torque at which the engine is most efficient. Adjustment of the lever 68 beyond either of the angular positions 84 or 85 adjusts the engine speed and vehicle speed will accordingly increase or decrease although not necessarily in accordance with proportional increase or decrease of engine speed. In order to brake the vehicle when travelling at speed it is merely necessary for the driver to move lever 68 slowly towards the neutral position. The ground engaging wheels will then drive the engine through the transmission at greater than its governed speed and the momentum of the vehicle will thus be dissipated in the engine. Assuming the vehicle is going forwardly hydraulic pressure will be generated in pipe 3 which if excessive causes movement of servo piston 48. However, the stop 55 will prevent the piston 46 from making contact with abutment 44 and therefore the displacement will remain as selected by cam 74. If fierce braking is required the lever 68 may be moved sufficiently close to the neutral position to reduce pump displacement to cause the momentum of the vehicle to be dissipated more quickly by driving the engine at an increased speed.

Reference is made to the graph shown in FIGURE 3 to illustrate the operations of cams 73 and 74. The full line in the graph relates to the angular displacement of the control lever 68 with the percentage of maximum pump displacement as selected by cam 74, while the dotted line indicates the control of engine speed with angular displacement of control lever 68 as obtained by the cam 73. The angular positions 84 and 85 are represented in the graph by the positions plus and minus 15° of lever displacement.

Reference is now made to the example shown in FIGURE 2 and where possible similar reference numerals will be used for similar items. As in FIGURE 1 the diesel engine 1 drives a variable displacement transmission pump 2 which pumps liquid through pipes 3 and 4 to a hydraulic motor 5 whose output is delivered to the ground engaging wheels by a shaft 6. The engine drives a fuel injection pump 7 controlled as in the previous example by the capsule 11 enclosing governor spring 12 and fed with reduced air pressure by pipe 17 from a Venturi 16 in the air intake manifold 15. Speed is controlled by the rod 14 acting on spring 12 and in engagement by follower 77 with cam 73. The engine 1 drives an auxiliary pump 18 of the gear type for feeding hydraulic liquid at low pressure from a reservoir 19 to a pipe 21 from whence it passes through non return valves 22 or 23 to pipes 3 and 4. Again the pump 2 has its displacement control by the servo motor 25 of conventional construction which in turn is controlled by the control rod 26. Again as in the previous example a control lever 68 is provided moving in a gate 71 and acting to rotate a shaft 69 to which is connected a pair of cams 73 and 74. For control of the selected pump displacement an apparatus substantially as described in above-mentioned Patent No. 2,976,685 is employed. This apparatus comprises an engine load sensing device 91 which acts in conjunction with a hydraulic jack 92 whose function is to reduce selected pump displacement. The overload sensing device 91 comprises a cylinder 93 mounted on the side of the engine for co-operation with the extension of the fuel bar 8 of the fuel injection pump 7. Within cylinder 93 a spool valve 94 is mounted having a projection 95 which is arranged to co-operate with the end of the fuel bar 8. The spool valve 94 is spring urged by spring 90 to an outermost position and normally acts to connect a port 96 to a reservoir port 97. When the fuel bar 8 has been moved inwardly to increase fuel supply to the engine to the maximum extent it is arranged that projection 95 makes contact with the fuel bar 8 and is urged inwardly by a slight excess movement of the fuel bar beyond the maximum fuel position. In this position the spool valve 94 connects a port 98 with the reservoir port 97 and with port 96 the openings of ports 97 and 98 being restricted. Ports 96 and 98 are connected by pipes 99 and 101 to a control valve unit 102. Within the unit 102 a pair of bores 103 and 104 are formed within each of which a spool valve member 105 and 106 respectively are located. The bore 103 is opened at both ends and from one end of the spool valve 105 and rod 107 extends to a short lever 108 carried by the shaft 69. The spool valve 105 controls liquid flow from a pair of ports 109 and 111 connected by pipes 112 and 113 with the transmission pipes 3 and 4. In the neutral position of the lever 68 the spool valve 105 is arranged to close both of the ports 109 and 111. A further port 114 extends from the bore 103 and is connected to the inner end of bore 104. Pressure supplied through port 114 moves the spool valve 106 to the left against the compression of spring 115 which is adjustable by means of a screw threaded nut 116. The spool valve 106 acts to connect together ports 117 and 118 or if the pressure supply by port 114 moves the valve 106 a sufficient distance against spring 115, valve 106 will connect port 118 to port 119.

The valve unit 102 controls operation of the displacement reducing jack 92 which is carried by a lever 121 mounted at fulcrum 122. The jack 92 comprises a cylinder 123 having piston 124 from which a piston rod 125 extends through one end of the cylinder. Flexible pipes 126 and 127 are connected to opposite ends of the cylinder 123. By virtue of the piston rod 125 extending from one end of the cylinder, piston 124 has different effective areas on opposite sides. Pressure from the pump 18 is fed through pipe 21 and the flexible pipe 127 to the end of cylinder 123 to act on the smaller area of piston 124. This pressure is permanently supplied while the engine and transmission are in operation and normally acts to move the piston 124 to the position furthest away from the fulcrum 122. The piston rod 125 is pivotally connected to the rod 26 which effects displacement control of pump 2, the rod 26 extending in direction generally at right angles to the piston rod 125. The flexible pipe 126 is connected to port 118 in valve unit 102 which normally is in connection by means of the spool valve member 106 with port 117. This port is connected through pipe 99 to port 96 in the overloading sensing unit 91. The opposite end of lever 121 is provided with a pin 79 which engages the cam slot 78 formed in the cam 74. The cam slot 78 is formed in three portions 81, 82 and 83. The portions 81 and 82 are the outer portions of which portion 81 has a larger radius of curvature than portion 82. Portion 83 interconnects portions 81 and 82.

In operation on a vehicle the control as described is sufficient for complete driving control of the vehicle other than for steering. To move forwardly the driver will merely move lever 68 forwardly until the vehicle is travelling at the required speed. Initial movement of lever 68 before reaching angular position 85 is to move the pin 79 along the cam slot 82 thus to give forward displacement of the pump which reaches the maximum at position 85. At the same time the cam surface 76 causes the governer rod 14 to be moved to the left to increase the governed speed of the engine. Beyond the angular position 85 the displacement of pump 2 remains at its maximum as determined by portion 82 of cam slot 78 and further increase in vehicle speed is obtained by increasing the governed speed of the engine. On the engine 1 the position of the fuel bar 8 will represent the loading of the engine and if in operation of the vehicle the condition should be reached that the pump 7 is adjusted by bar 8 to give fuel injection then the bar 8 will push the spool valve 94 inwardly to tend to close port 97 and connect port 96 to 98 in the overloading sensing unit 91. This action connects pipes 99 to pipe 101 and thus pressure from the pump 18 supplied through pipe 21, pipes 101 and 99 will reach the port 118 and act on the larger area of the piston 124 of jack 92 urging the piston towards the fulcrum 122 of lever 121 thus reducing the selected displacement given to the servo control rod 26. As displacement is reduced the load will be removed from the engine and at a position where the spool valve 94 is allowed almost to return to its normal position a position of balance will be attained where the pressure fed through pipe 99 is in between the pressure from pipe 101 and the reservoir pressure, this pressure acting on the larger area of piston 124 so as to balance the pressure from pipe 127 applied on the small area of piston 124, thus locating the servo control rod at reduced displacement position where the engine is just fully loaded. This action will usually occur during acceleration of the vehicle or during the period when the vehicle is climbing an incline. Also it will occur during the higher speeds of travel on the level. Thus it may be said that for most conditions of operation the engine operates in a fully loaded state, the gear ratio of the transmission as determined by the displacement pump 2 acting automatically to adjust the speed of the vehicle to ensure that there is full loading for the particular governor setting as determined by the position of lever 68. In the event that the driver wishes to reduce speed he moves the lever 68 towards the neutral position. Momentum of the vehicle then drives the engine through the transmission whose displacement is at the value determined by the position of lever 68. If fierce braking is demanded the lever 68 may be moved quite close to the neutral position to cause reduction in pump displacement whereby the momentum of the vehicle is dissipated in the engine by causing it to rotate at high speed. Under such operation the overloading sensing device will retain the jack 92 at the position corresponding to the selected displacement. If whilst the engine is driving the transmission the pressure rises to a dangerously high level the spool valve 106 will be moved by virtue of this pressure which is fed from the pipe 114 from the appropriate transmission pipes 3 or 4. Movement of the control lever 68 on either side of the neutral position moves lever 108 to cause appropriate movement of the spool valve 105 to ensure that the appropriate port 111 or 107 according to the direction of movement is connected to pipe 114. This ensures that dangerously high pressures developed in pipe 3 or 4 during driving of the vehicle is fed to piston 106 to move it against spring 115 to connect port 119 to port 118 thus connecting pressure from pump 18 to the larger area of piston 124 to cause reduction of the selected displacement of the pump 2. It is important that pressure generated in the transmission during braking of the vehicle should not be able to cause reduction of selected pump displacement since this might result in damage to the transmission and the engine and it will be seen that piston valve 105 as operated by the lever 108 is an adequate assurance that the pipe 3 or 4 which is under pressure during braking cannot feed its pressure to the spool valve 106 through passage 114. When the driver finds it necessary to manoeuvre his vehicle it is merely necessary for him to move the lever 68 a small amount within the angular positions 84 and 85 and the vehicle can then be moved slowly by virtue of slow engine speed and small selected pump displacement.

We claim as our invention:

1. In combination with a variable speed prime mover, a power transmission driven thereby and arranged for connection to a load, and control apparatus including speed-varying means for said prime mover, infinitely variable speed ratio control means for said transmission, a single manual control member movable from a neutral to a maximum position, a first operative connection between said control member and said speed-varying means arranged to increase the prime mover's speed substantially evenly with movement of said control member from neutral to maximum, a second operative connection between said control member and said speed ratio control means, said second operative connection including means to increase the speed ratio of the transmission to a maximum during the first part of control member movement from neutral, and to retain such speed ratio at maximum during the remainder of control member movement to maximum, and means sensitive to overload upon the prime mover and operatively connected to the speed ratio control to reduce such speed ratio automatically to the extent to remove such overload.

2. A control apparatus as claimed in claim 1 wherein the power transmission comprises a variable positive displacement hydraulic pump driven by the prime mover, a positive displacement hydraulic motor connected to drive the load and hydraulic connection between the pump and motor, whereby the speed ratio is determined by pump displacement, and the means sensitive to overload comprises pressure sensing means connected to the hydraulic transmission and arranged to respond to pressure supplied from the pump to the motor in excess of a value variable inversely with pump displacement, displacement reducing means arranged to reduce selected displacement of the hydraulic pump to the extent that the response of the pressure sensing means is reduced to zero whereby the driving torque demanded by the pump from the engine may be prevented from exceeding a maximum value.

3. A control apparatus as claimed in claim 2 wherein the transmission pump is of reversible variable positive displacement to enable the transmission to have an infinitely variable speed ratio in both forward and reverse directions and a pair of displacement reducing means are provided, one for reducing forward displacement and the other for reducing reverse displacement to zero but not beyond.

4. A control apparatus as claimed in claim 1 wherein the power transmission comprises a variable positive displacement hydraulic pump driven by the prime mover, a positive displacement hydraulic motor connected to drive the load and hydraulic interconnection between the pump and the motor, the speed ratio being determined by varying the pump displacement, and wherein the prime mover comprises an engine deriving its power from a motive fluid the flow rate of which is controlled by a speed governor, and the means sensitive to overload comprises means responsive to reduction from the governed speed and displacement varying means arranged to reduce selected displacement of the hydraulic pump to the extent that the engine speed may be maintained substantially at the selected value.

5. A control apparatus as claimed in claim 4 wherein the engine is a diesel engine having a variable displacement fuel pump controlled by said speed governor to retain engine speed at the selected value and said means sensitive to overload is arranged to reduce transmission pump displacement when the fuel pump displacement exceeds a predetermined value.

6. A control apparatus as claimed in claim 1 wherein the single manual control includes a manually operable lever and the first and second interconnections each comprise a cam and follower.

References Cited in the file of this patent
UNITED STATES PATENTS

| | | |
|---|---|---|
| 1,259,090 | Ferris et al. | Mar. 12, 1918 |
| 1,981,805 | Kacer et al. | Nov. 20, 1934 |
| 2,556,378 | Sisson | June 12, 1951 |
| 2,774,436 | Ferris | Dec. 18, 1956 |